United States Patent [19]

Kempner et al.

[11] 4,451,700

[45] May 29, 1984

[54] AUTOMATIC AUDIENCE SURVEY SYSTEM

[75] Inventors: Marvin A. Kempner, Lighthouse Point; Robert E. Elder, Pompano Beach, both of Fla.

[73] Assignee: M. A. Kempner, Inc., Pompano Beach, Fla.

[21] Appl. No.: 412,079

[22] Filed: Aug. 27, 1982

[51] Int. Cl.$^3$ .......................................... H04M 11/00
[52] U.S. Cl. .................................................. 179/2 AS
[58] Field of Search ............. 179/2 AS, 1 SM, 1 VC, 179/18 B, 6.02, 6.04, 1 SD, 6.14; 455/2; 364/513.5; 381/43–45, 51–53

[56] References Cited

U.S. PATENT DOCUMENTS

| | | | |
|---|---|---|---|
| 3,688,126 | 8/1972 | Klein | 179/1 SD X |
| 3,950,618 | 4/1976 | Bloisi | 179/2 AS |
| 4,255,618 | 3/1981 | Danner et al. | 179/1 SM X |
| 4,283,601 | 8/1981 | Nakajima et al. | 179/1 SD |
| 4,320,256 | 3/1982 | Freeman | 179/2 AS |

Primary Examiner—A. D. Pellinen
Assistant Examiner—W. J. Brady
Attorney, Agent, or Firm—Joseph Zallen

[57] ABSTRACT

A telephone based automatic audience survey system for polling an audience to obtain data representative of the opinion regarding a question of interest is disclosed having a first means responsive to incoming calls for answering the calls with an analog voice signal that both identifies the telephone based automatic audience survey system and queries a response in regard to the question of interest, and a second means connected to the first means and responsive to the answers provided to the query portions of the analog voice signal for providing data representative of the consensus regarding the question of interest. Third means connected to the second means are operative to display the data in real-time. The third means includes a video character generator, an audio signal generator, and an operator display.

34 Claims, 13 Drawing Figures

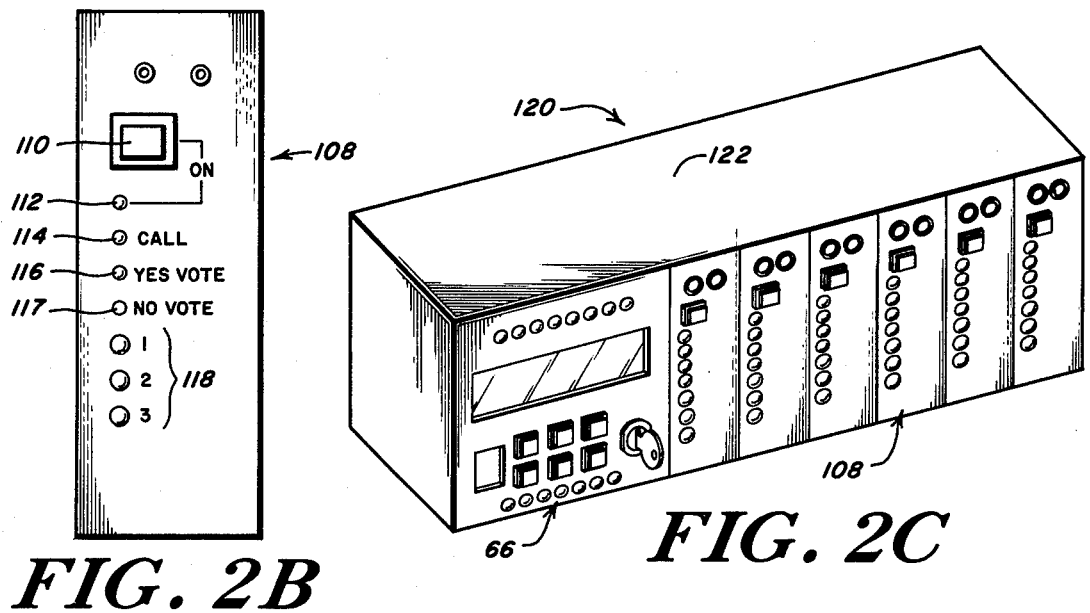
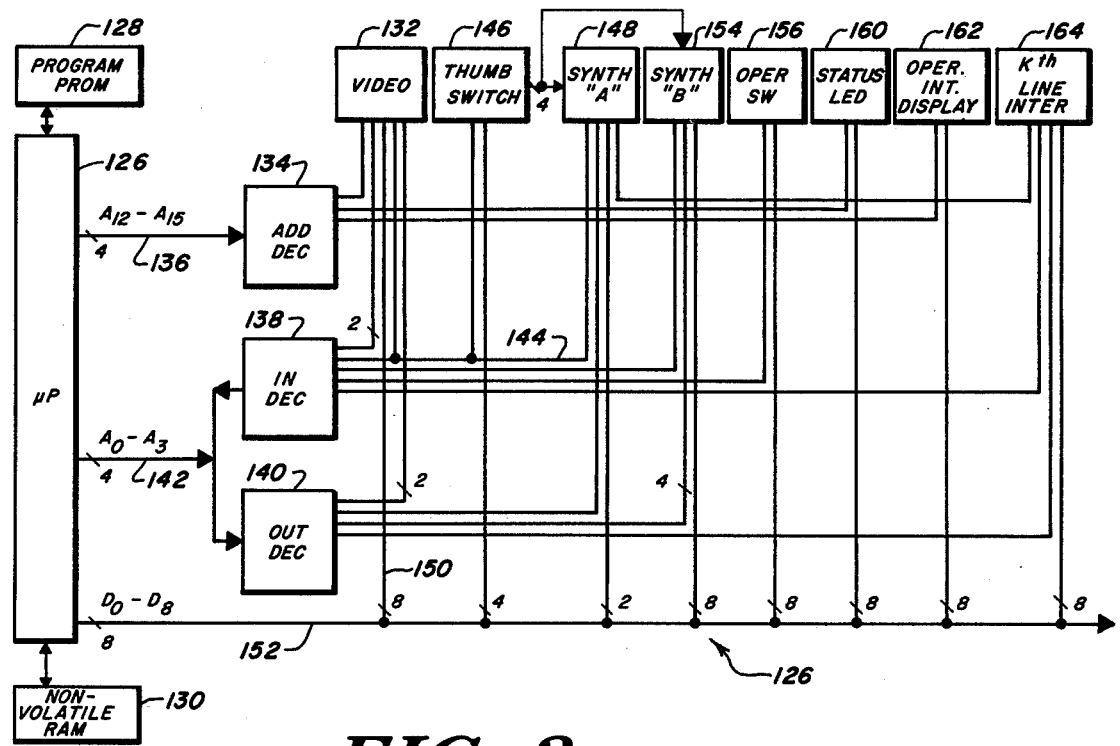

AUTOMATIC AUDIENCE SURVEY SYSTEM

FIELD OF THE INVENTION

This invention is drawn to the field of telephony, and more particularly, to an automatic audience survey system.

BACKGROUND OF THE INVENTION

Various business, governmental, and media-based organizations often find it desirable to obtain reliable and timely data representative of opinion in regard to some question of local, regional, or national interest. Typically, the question of interest is broadcast via the transmitter of a televison or radio station and individuals in the station audience are invited to express their opinion in regard to the matter by the use of their telephone sets. Telephone-based audience survey systems are called upon to handle a high caller volume at a relatively low cost in a manner which insures wide audience acceptability and which provides highly reliable data.

Presently available telephone based audience survey systems are expensive and labor intensive. Where the survey is conducted manually by operators or the like, it is not only costly but slow. Where such surveys have been conducted by the telephone company, two separate telephone numbers are required for the participant and the information as to the results must be obtained from an office of the telephone company. Thus it is desirable to provide an automatic audience survey system which can be housed and controlled in the television or radio station, which permits the participants to call a single telephone number, which requires a minimum of labor, and which is faster and far less costly than the known automatic audience survey systems.

SUMMARY OF THE INVENTION

The automatic audience survey system of the present invention is accessed by a single telephone number. The equipment, which can be housed at the radio or television station and controlled therein, comprises a first means for holding an incoming call in an off-hook condition, a second means for providing a voice-message which queries a response to a pre-selected question, and a third means for recognizing the response to the query and providing data reflecting the responses in pre-selected categories.

The automatic audience survey system of the present invention is responsive to incoming calls received from a plurality of individuals in the survey audience and operative to synthesize an analog voice signal which both identifies the system and queries a response in operator-selectable categories concerning the question of interest. The automatic audience survey system of the present invention is responsive to the answers provided by the individuals to the query and operative to recognize the response given and to latch, compile, and display data representative of the consensus regarding the matter of interest. The synthesized analog voice signal consists of a common portion which identifies the automatic audience survey system and an operator-selectable portion which queries audience response in regard to the question of interest. One of six operator-selectable voice messages, such as true/false, yes/no, like/dislike, agree/disagree, for/against, and A/B, can be selected. On the order of one hundred incoming phone lines can be handled and each line can process up to 360 calls per hour.

A video subsystem of the automatic audience survey system of the present invention is operative to superimpose both the user selectable portion of the synthesized voice message and the tabulated data to a video feedline for real-time transmission either to the survey audience or to a remotely positioned CRT monitor. The tabulated data representative of the consensus can be displayed in either a percentage mode or an absolute mode.

An audio subsystem of the automatic audience survey system of the present invention is operative to synthesize an analog signal consisting of the selectable portion of the voice message and the tabulated data to an audio feedline for realtime transmission either to the survey audience or to a remotely positioned speaker monitor. The data representative of the consensus can be transmitted in either a percentage mode or an absolute mode.

A telephone line interface control subsystem of the automatic audience survey system of the present invention interfaces each of the incoming calls to a system microprocessor. The telephone line interface control subsystem for each incoming line is responsive to an incoming call and operative to detect a ring, to pick-up the line in an off-hook condition, to recognize the response of the caller to the matter of concern, and to latch data in categories representative of the expressed opinion of a caller for subsequent readout to the system microprocessor for tabulation and compilation. The data latch of individual ones of the telephone line interface control subsystems is connected to the next successive data latch of the electrically adjacent telephone line interface control subsystem to provide a shifting readout to the system microprocessor.

An operator interactive plasma display subsystem of the automatic audience survey system of the present invention is operative to display the tabulated data, to display the operator-selectable portion of the voice message, and to display system-generated status information during initialization and malfunction correction. A plurality of status LED's monitor selected circuit points and provide a visual indication of system operation. A plurality of operator interface control switches are operative to turn the system on and off, to initialize microprocessor operation, and to select and control the various subsystems of the automatic audience survey system. The automatic audience survey system of the present invention is constructed of rack-mounted and readily interchangeable modular plug-in units.

BRIEF DESCRIPTION OF THE DRAWINGS

The invention will become better understood by referring to the following exemplary and non-limiting detailed description of the preferred embodiment, and to the drawings, wherein:

FIG. 3 shows a simplified schematic diagram of the automatic audience survey system of the present invention;

DETAILED DESCRIPTION OR THE PREFERRED EMBODIMENT

Figure 1A:
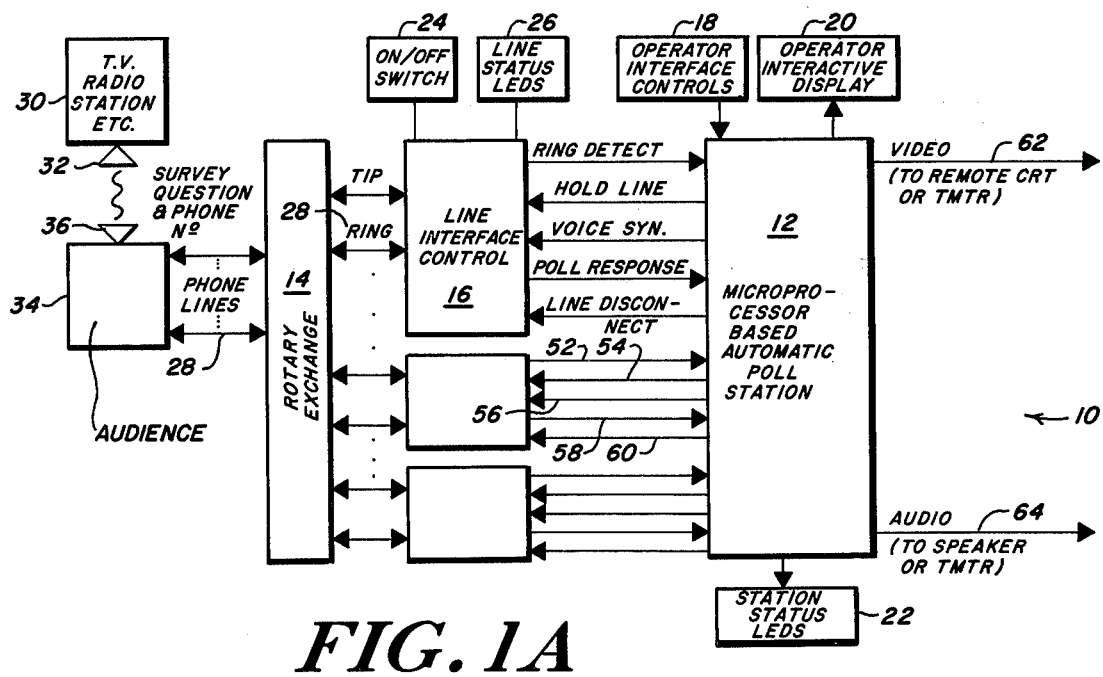
FIG. 1 shows in FIG. 1A a block diagram and shows in FIG. 1B a timing diagram depicting the operation of the automatic audience survey system of the present invention.

Referring now to FIG. 1A, generally designated at 10 is a functional block diagram of the automatic audience survey system of the present invention. The automatic audience survey system 10 includes a microprocessor based automatic telephone polling station 12 connected to a rotary-type telephone exchange 14 via a plurality of telephone line interface control subsystems 16. The microprocessor based automatic polling station 12 is provided with an operator interface control subsystem 18, an operator interactive display 20, and a plurality of station status LED's 22. Each of the telephone line interface control subsystems are provided with an on/-off switch 24 and a plurality of line status LED's 26. A plurality of tip and ring lines 28 are connected between the rotary-type telephone exchange 14 and respective ones of the telephone line interface control subsystems 16.

In operation, a preselected media such as a television or radio station 30 transmits over an aerial 32 a survey question and a single, pre-assigned telephone number. Each of the individuals of an audience 34 respectively receive the broadcast message over individual ones of a plurality of aerials 36 and, depending upon individual interest, use their telephones to call the broadcast number to express their opinion in regard to the survey question.

Figure 1B:
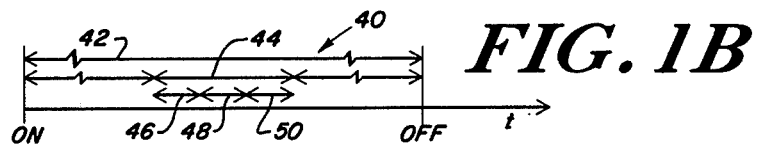

Referring now briefly to FIG. 1B, which shows generally at 40 a timing graph, the system 10 collects data from incoming calls for a time interval designated 42 which extends between an "on" and an "off" time point defining the duration of data collection. The system 10 subdivides the interval 42 into a plurality of data collection intervals 44, where each of the data collection intervals 44 has a data collection window 46, a vote enable and line disconnect window 48, and a vote tabulate window 50, all to be described.

During the data collection window 46 of respective data collection intervals 44, individual ones of the telephone line interface control subsystems 16 are responsive to incoming calls and are operative to provide a ring detect signal designated 52 to the microprocessor-based automatic poll station 12. The station 12 is responsive to each of the ring detect signals appearing from successive ones of the telephone line interface control subsystems 16 and is operative to apply a signal designated 54 to corresponding ones of the telephone line interface control subsystems to hold each of the lines active in an off-hook condition.

At the close of the data collection window 46 and at the beginning of the voting window 48 of respective data collection intervals 44, the microprocessor-based poll station 12 is operative to synthesize a voice message designated 56 to the telephone tip and ring lines of the active telephone line interface control subsystems. The synthesized voice message consists of a portion which identifies the system 10 and an operator-selectable portion which queries audience response to the question of interest. An exemplary voice message is "thank you for calling instant audience survey, vote yes after I say yes and vote no after I say no, ready, yes pause no pause." The operator-selectable queries preferably are true/-false, yes/no, A/B, like/dislike, agree/disagree, and for/against. It will be appreciated that almost any question of interest can be formulated to be answerable by at least one of the above categories.

Following each of the above identified pauses, the microprocessor is operative to enable corresponding ones of the active telephone line interface control subsystems to latch data representative of pollee response designated 58 in respective vote categories. In the preferred embodiment, microprocessor controlled voice activated logic to be described is employed for this purpose. It is to be noted, however, that any other suitable means such as a speech recognition module may be used as well without departing from the inventive concept.

The microprocessor is then operative during the data tabulation window 50 of respective data collection intervals 44 to tabulate the data representative of pollee response and then to disconnect the active lines as designated at 60. This process is then repeated for successive data collection intervals for the duration of data collection.

The operator interface controls 18 are selectably actuatable to display the tabulated data on the operator interactive display 20, to display the data over a video feedline 62 to either a remote CRT or for real-time transmission back to the survey audience, or to display the tabulated data either over an audio feedline 64 to either a remote speaker or for real-time transmission back to the survey audience. The video signal and the audio signal are respectively provided by a video subsystem and an audio subsystem to be described.

Figure 2A:
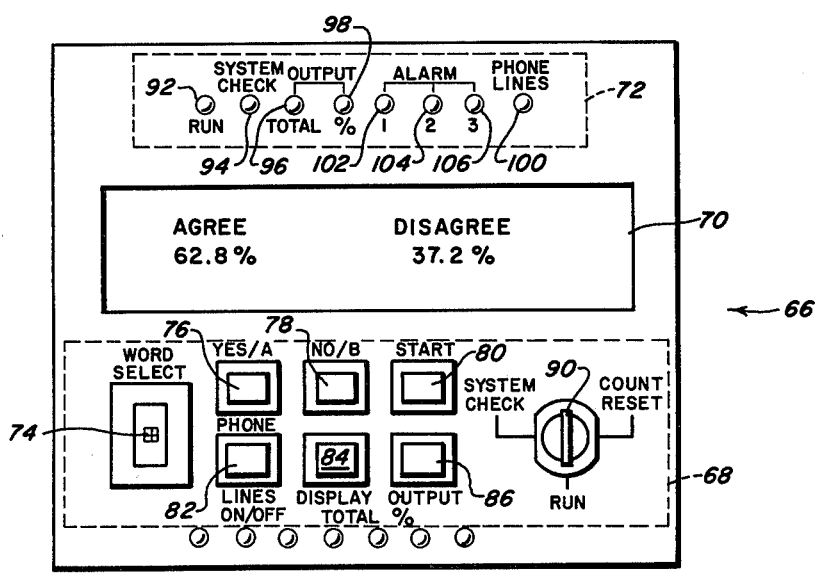
FIG. 2 shows in FIG. 2A a pictorial view of the front panel of the microprocessor-based automatic telephone polling station of FIG. 1A, shows in FIG. 2B a pictorial view of the front panel of the telephone line interface control subsystems of FIG. 1A, and shows in FIG. 2C a pictorial view of a preferred embodiment of the automatic audience survey system of the present invention.

Referring now to FIG. 2A, generally designated at 66 is a pictorial view of the front panel of the microprocessor based automatic telephone polling station of the present invention in preferred embodiment having an operator interface control subsystem designated by a dashed box 68, an operator interactive display subsystem 70, and a plurality of station status LED's designated by a dashed box 72. The microprocessor interface controls 68 include a BCD rotary-type query select switch 74; six push-contact switches 76–88 respectively labelled "yes/A", "no/B", "start", "phone line on/off", "display/total", and "output/%"; and a key operated switch 90 having three positions designated "system check", "run", and "count reset".

As will appear more fully below, the switch 74 is operative to select one of the above-noted queries and switches 76 and 78 are operative to initialize the system microprocessor and to provide operator input for correcting errors and for system initialization. Switch 80 turns the system on, switch 82 is operative to connect and to disconnect all of the phone lines, switches 84 and 86 are respectively operative to select for display either an absolute or a percentage mode readout and to respectively enable the plasma display 70 or the video/audio subsystems. Switch 90 in the left position is operative to initialize the system, is operative in the middle position to enable the system, and is operative in the right position to reset the data count. An LED 92 monitors the switch 90 in the right position and an LED 94 monitors the switch 90 in the middle position. An LED 96 monitors the state of the switch 82 and an LED 98 monitors the state of the switch 86. An LED 100 monitors the state of the switch 82. LED's 102, 104, and 106 monitor critical areas of system function and provide a visual indication of system malfunction. The operator interactive display 70 preferably is a thirty-two character microprocessor-controlled plasma display subsystem commercially available as component number APD-32A025 from Dale Electronics.

Referring now to FIG. 2B, generally designated at 108 is a pictorial view of the front panel of the preferred embodiment of the telephone line interface control subsystems of the automatic audience survey system of the present invention. Front panel 108 includes a push-contact switch 110 operative to connect and to disconnect the individual modules and an LED 112 which monitors the state of the switch 110. An LED 114 monitors whether the line has an incoming call or not, and an LED 114 and an LED 116 respectively monitor the category of pollee response to the question of interest. Variable resistors 118 are operator accessible to provide sensitivity adjustment to each of the telephone line interface control subsystems.

Referring now to FIG. 2C, generally designated at 120 is a perspective view of the automatic audience survey system of the present invention in preferred embodiment. The microprocessor-based automatic polling station generally designated 66 is mounted in a rack housing 122 along with six telephone line interface control subsystems generally designated 108. Additional racks each having up to nine rack-mounted telephone line interface control subsystems may be serially added to accomodate the needs of the particular application of the user.

Refering now to FIG. 3, generally designated at 124 is a simplified schematic diagram of the automatic audience survey system of the present invention. The automatic audience survey system 124 includes a system microprocessor 126, preferably a Z-80 commercially available from the Zilog Corporation, operatively connected in the usual manner to a program PROM 128 and to a scratch pad RAM 130. Preferably, the scratch pad RAM 130 is a nonvolatile RAM commercially available from the Catalyst Research Corporation. The nonvolatile RAM 130 is operative to preserve the count data representative of the consensus even in the event of a system power failure.

The video subsystem 132 is operatively connected to the system microprocessor 126 via an address decoder 134 to the four highest order address lines 136 of the address bus. The address decoder 134 is preferably a 4 to 10 decoder of the 74 LS 42 type. The video subsystem is also operatively selected by the microprocessor 126 either via an input decoder 138 or an output decoder 140. The input decoder 138 and the output decoder 140 are connected to the four lowest order lines 142 of the system microprocessor address bus. Preferably, both of the decoders 138 and 140 are 4 to 10 decoders of the 74 LS 42 type. A line 144 is operatively connected between the input decoder 138, the BCD thumbwheel switch 146, a first voice synthesizer subsystem 148, and the video subsystem 132. The eight line connection 150 to an eight bit data bus 152 having lines $D_0$–$D_7$ of the system microprocessor 126 completes the microprocessor control interconnection to the video subsystem peripherial 132.

The thumbwheel switch 146 preferably is a BCD rotary switch having at least six postions each of which provides a different four bit code word which respectively correspond to one of the preselected plurality of operator-selectable queries. The thumbwheel switch 146 is mounted to the front of the control panel and is operatively connected to the microprocessor 126 via the input decoder 138 and to four lines of the data bus 152. The thumbwheel switch 146 is also operatively connected over four lines to the first "A" synthesizer 148 and over four lines to a second "B" synthesizer audio subsystem peripheral 154. The audio subsystem peripheral 154 is operatively connected to the microprocessor 126 via the input decoder 138, the output decoder 140, and to the eight bit data bus 152.

An operator interactive switch peripheral subsystem 156 is operatively connected to the microprocessor 126 via the input decoder 138 and the eight line data bus 152. A status LED peripheral subsystem 160 and an operator interactive display subsystem 162 are operatively connected to the microprocessor 126 via the address decoder 134 and the data bus 152.

A plurality of telephone line interface control subsystem peripherals 164, one of which is illustrated, are operatively connected to the microprocessor 126 via the input decoder 138, the output decoder 140, and the eight bit data bus 152. Each of the telephone line interface control subsystems are also connected to the synthesizer peripheral 148. It will be appreciated that although in the preferred embodiment both I/O and memory-mapped peripheral control is employed, the peripherals can be selected using either technique alone without departing from the inventive concept.

Figure 4:
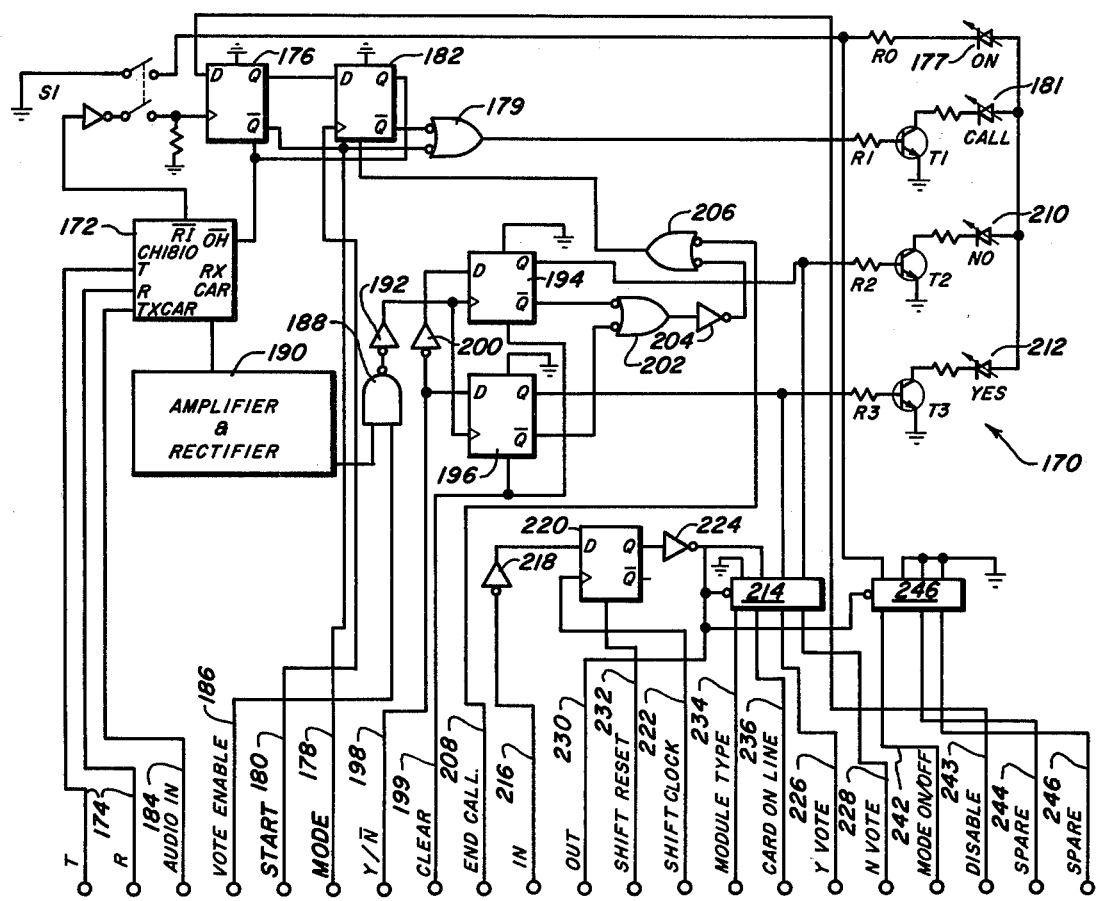
FIG. 4 shows a schematic diagram of one of the telephone line interface control subsystems of the automatic audience survey system of the present invention.

Refering now to FIG. 4, generally designated at 170 is a schematic diagram of one of the telephone line interface control subsystem peripherals of the automatic audience survey system of the present invention. The automatic audience survey system utilizes a plurality of telephone line interface control subsystems 170 in dependance on the application environment as above discussed. Each of the line interface subsystems 170 is preferably constructed on a PC board in a manner well known to those skilled in the art.

The telephone line interface control subsystems 170 preferably include a CH 1810 direct connect protective hybrid telephone line interface controller 172 commercially available from Cermetek Micro Electronics. The tip and ring lines 174 of a phone connection are applied to the terminals designated "T" and "R" on the controller 172. The controller 172 is responsive to an incoming call on the lines 174 and operative to provide a ring detect pulse out of the terminal designated "RI" to a switch S1 (designated as 110 in FIG. 2B) which, if in the "on" state, applies the ring detect pulse to the clock terminal of a flip-flop (FF) 176. The ring detect pulse is also applied to an LED 181 (designated as 114 in FIG. 2B) to provide a visual indication of line status. The Q output terminal of the FF 176 is driven to logic one and the $\overline{Q}$ output terminal of the FF 176 is driven to a logic zero by the ring detect pulse. The logic zero pulse is applied over a line 178 designated "mode" to the system microprocessor to provide an indication thereto that an incoming call is being received. The logic zero pulse is also applied via one terminal of a NOR gate 179 to a LED 181 (designated as 114 in FIG. 2B) to provide a visual indication that a call is being received.

After a predetermined time delay which corresponds to FCC part 68 requirements, the system microprocessor sends a pulse over a line 180 designated "start" to the clock terminal of a FF 182. The D terminal of the FF 182 is connected to the Q terminal of the FF 176. The start pulse applied over the line 180 to the clock terminal of the FF 182 drives the Q terminal of the FF 182 to logic one. The logic one pulse is applied to the "OH" terminal of the controller 172 and to the reset terminal of the FF 176. The controller 172 is operative to hold the line in an off-hook condition in response to the logic one pulse applied to the "OH" terminal thereof. During a preselected time delay which corresponds to the data collection window 146 of FIG. 1B, incoming calls are successively received and processed in the above manner by electrically adjacent telephone line interface control subsystems. Whereafter, the system microprocessor enters the voting period 48 of FIG. 1B.

The system microprocessor is then operative to controllably apply a first voice-message, preferably provided by an "A" synthesizer in a manner to be described, to the transmit carrier "TX CAR" terminal of the controller 172 of all the active telephone line interface control subsystems over a line 184 designated "audio in". The controller 172 is operative to apply the synthesized voice message to the tip and ring lines 174 so that the individual callers of the survey audience hear the synthesized analog voice message. As above noted, the voice message consists of a common portion which identifies the automatic audience survey system of the present invention and an operator selectable portion which queries the caller in regard to the matter of interest. It is to be noted that any suitable means for applying a voice message to the active lines of the line interface control subsystems such as a tape recorded voice-message may be employed as well without departing from the inventive concept.

After the common portion of the operator selected voice message is synthesized and applied over the line 184 to that plurality of calls which have reached the automatic audience survey system during the data collection interval, the system microprocessor is operative to apply a pulse over a line 186 designated "vote enable" to one terminal of a NAND gate 188. The response of the caller over the phone lines 174 is applied through the receive carrier terminal, designated "RX CAR", of the controller 172 and applied through an amplifier and rectifier 190 of conventional design to the other terminal of the NAND gate 188.

The amplifier and rectifier 190 converts the response to the individual caller to the matter of interest to a DC level which in turn enables the inverting NAND gate 188 at a time which corresponds to individual ones of the categories of the particular operator-selected query. The output terminal of the inverting NAND gate 188 is applied via an inverter 192 to the clock terminals of a "no" FF 194 and a "yes" FF 196. Concurrently, the system microprocessor sends a dual high and low pulse over a line 198 designated "Y/N" which is applied to the D terminal of the "yes" FF 196 and to the D terminal of the "no" FF 194 via an inverter 200. Whenever the pollee response to the question of interest is in the affirmative, the Q terminal of the "yes" FF 196 is driven high and the Q̄ terminal is driven low. The Q̄ terminal of the FF 196 is connected to the reset terminal of the FF 182 via one terminal of a NOR gate 202 the output terminal of which is connected through an inverter 204 to one terminal of a NOR gate 206. A reset pulse is thus applied to the reset terminal of the flip-flop 182 in response to a change of state of the "yes" FF 196 which drives the Q terminal low. The low state signal is applied to the "OH" terminal of the controller 174 which automatically disconnects the caller from the line.

In a similar fashion, whenever the pollee responds to the question of interest in the negative, the Q terminal of the "no" FF 194 is thereby driven high, the Q̄ is driven low, and a line disconnect pulse is applied to the "OH" terminal of the controller 174 to again automatically disconnect the line. In the event that the caller fails to respond to the operator-selectable query portion of the synthesized voice message in a time which corresponds to the above noted first and second switch points, the system microprocessor is operative to send a pulse over a line 208 designated "end call" to the NOR gate 206 to disable the phone line.

The Q terminal of the "no" FF 194 is connected through a resistor R2 and a transistor T2 to an LED 210 (designated as 117 in FIG. 2B) to provide a visual indication that a no-vote had been expressed. The Q terminal of the "yes" FF 196 is likewise connected through a resistor R3 and a transistor T3 to a LED 212 to provide a visual indication that a yes-vote has been expressed.

The logic levels of the Q terminals of the "no" and the "yes" flip-flops 194 and 196 are latched in respective locations of a tri-state buffer 214 for readout to the system microprocessor during the tabulate vote window 50 of FIG. 1B. Preferably, the tri-state buffer 214 is an 81LS97.

At the time which corresponds to the beginning of the vote tabulate window 50 of FIG. 1B of successive data collection intervals, the system microprocessor is operative to send a logic low pulse over a line 216 designated "in" which is applied through an inverting buffer 218 to the D terminal of a FF 220. The microprocessor also sends a pulse train over a line 222 designated "shift CLK" to the clock terminal of the FF 220.

A logic one appears at the Q terminal of the FF 220 in response to signals applied over the lines 216 and 222 and is connected to an inverting enable terminal of the tri-state buffer 214 via an inverter 224. Whereupon, the data representative of the yes or the no response is read out to the system microprocessor over lines 226 and 228 designated "Y vote" and "N vote", respectively.

The output of the inverter 224 is connected to a line 230 designated "out". The "out" line of each successive telephone line control subsystem is connected to the next electrically adjacent line 216 designated "in". Thus, in preferred embodiment, the microprocessor sends a single low pulse to the first telephone line interface control subsystem peripheral to initiate data readout. Subsequent control readout pulses to successive line modules are supplied by the pulse provided from the output line 230 of the electrically prior board to the input line 216 of the successive board. In this manner a shifting readout from successive ones of the telephone line interface control subsystems is provided. When the last telephone line interface control subsystem is reached, the microprocessor is operative to apply a reset pulse to all the telephone line interface control subsystems via a line 232 designated "shift reset" to the reset terminal of corresponding ones of the FF 220.

A line 234 designated "mod type" and a line 236 designated "card on line" extend from respective locations of the tri-state buffer 214 and provide data to the system microprocessor during system initialization in a manner to be described. A line 238 designated "disable" is connected to the D terminal of the FF 176 and is operatively connected to the switch 82 of FIG. 2A and to the system microprocessor to disable all of the telephone line interface control subsystems. Lines 240, 242, and 244 are connected to a second tri-state buffer 246 which may be employed to implement a voice recognition module, not shown.

Figure 5:
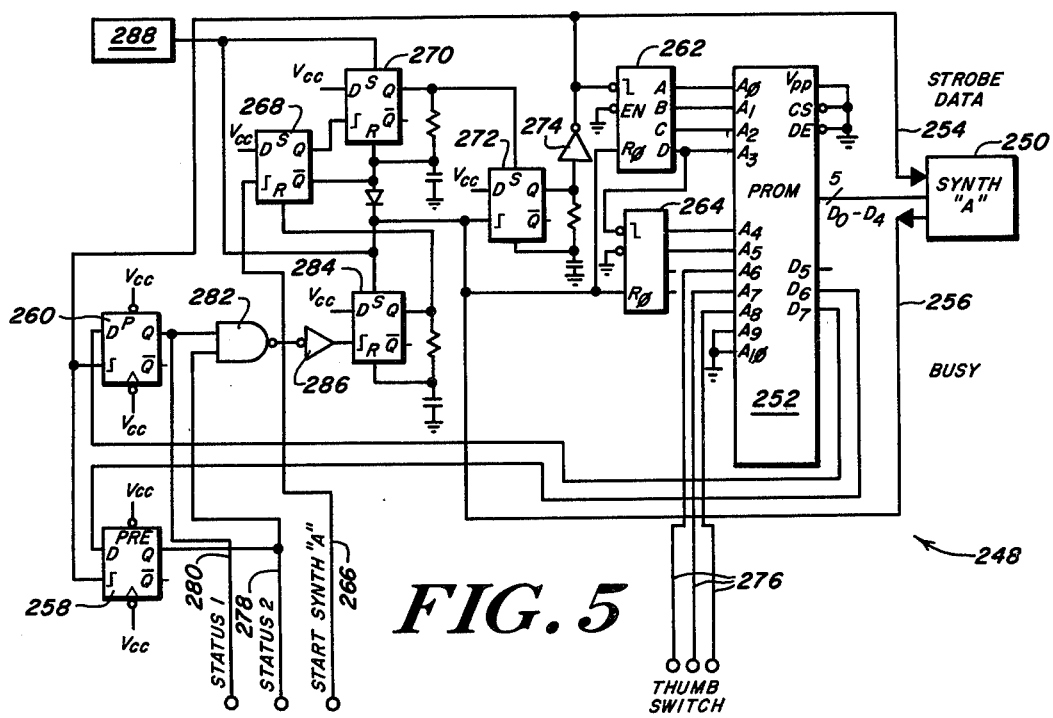
FIG. 5 shows a schematic diagram of the voice message synthesizer subsystem of the automatic audience survey system of the present invention.

Referring now to FIG. 5, generally shown at 248 is a schematic diagram of a voice synthesis module used to synthesize the voice message to the incoming phone lines of the automatic audience survey system of the present invention which identifies the station and queries audience response in respective operator selectable categories. The first voice synthesizer subsystem 248 is preferably constructed on a PC board in a manner well known to those skilled in the art.

The voice synthesis module 248 includes a first voice synthesis peripheral 250 having five data lines designated $D_0$–$D_4$ connected to a PROM 252, a line 254 designated "strobe", and a line 256 designated "busy". Preferably, the voice synthesis subsystem peripheral 250 is a General Instruments VSM 2032. The $D_6$ and $D_7$ data lines of the PROM 252 are respectively connected to the D terminals of status latches 258 and 260 operative in a manner to be described. A counter 262 is connected to the lower order address lines of the PROM 252, a second cascaded counter 264 is connected to the intermediate order address lines $A_4$ and $A_5$ of the PROM, and the higher order address lines $A_6$ and $A_8$ of the PROM 252 are operatively connected over lines 276 marked "thumb switch" to the thumbwheel switch 146 of FIG. 3.

At the beginning of the vote enable window 48 of FIG. 1B, the system microprocessor is operative to send a pulse over a line 266 designated "start synth A" to the clock terminal of a latch 268. The latch 268 is responsive to the rising edge of the start synthesizer "A" pulse and operative to set the Q terminal thereof to logic one. The logic one signal is applied to the clock terminal of a one-shot 270 which is responsive to the rising edge of the logic one signal and operative to set the Q terminal thereof to logic one. The Q terminal of the one-shot 270 is connected to the set terminal of a one-shot 272.

The one-shot 272 is responsive to the high signal applied to its set terminal an operative to set the Q terminal thereof to logic one. The logic one signal therefrom is applied through an inverter 274 to a falling edge enable terminal of the counter 262, to the strobe data line 254 of the synthesizer 250, and to the rising edge enabled clock terminal of the latches 258 and 260.

The pulse applied to the strobe data line 254 of the synthesizer 250 enables the synthetizer to accept data. The pulse applied to the falling edge enabled terminal of the counter 262 is operative to address a first preselected location in PROM to provide data therefrom over the PROM data lines to the synthesizer 250. Whereupon, the busy line 256 goes low.

After the data corresponding to the first syllable is transferred from the PROM 252 to the synthesizer 250 and is spoken, the busy line 256 goes high. At the rising edge of the high signal, the one-shot 272 is clocked and the Q output terminal thereof is set high once again. The high signal is inverted in the inverter 274 and the resulting low pulse both advances the count in the counter 262 and enables data transfer from the PROM 252 to the synthesizer 250 over the line 254. Whereupon, the data that corresponds to the new address is read out to the synthesizer 250 and the signal applied over the busy line 256 goes low. The synthesizer "A" then speaks the syllable that corresponds to the corresponding address of the voice synthesized message over the tip and ring lines of the active telephone line interface control systems. It will be appreciated that this process is repeated until all of the syllables of the voice meassage have been addressed, transferred, and spoken by the synthesizer 250.

After all of the syllables which correspond to the first phrase of the operator-selectable portion of the voice query is spoken by the snythesizer 250, the $D_6$ terminal of the PROM 252 goes high. This high signal is applied to the D terminal of the latch 258 which sends a signal over a line 278 marked "status 2" to the system microprocessor that indicates thereto that the voice synthesizer 250 has spoken the first query of the operator selectable portion of the voice synthesized message.

After all of the syllables of the second query of the operator selected portion of the voice synthesized message is spoken by the synthesizer 250, the $D_7$ terminal of the PROM 252 goes high. This high signal is applied to the D terminal of the latch 260 which is operative to send a signal over a line 280 marked "status 1" to the system microprocessor that indicates thereto that the voice synthesizer 250 has spoken all of the syllables of the second query of the operator-selectable portion of the voice message. The high signals provided over the lines 278 and 280 are also applied to the input terminal of a NAND gate 282. The output terminal of the NAND gate 282 is connected to a one-shot 284 via an inverter 286. The Q terminal of the one-shot 284 is connected to the reset terminal of the latch 268. The presence of a high signal on both of the input terminals of the NAND gate 282 is operative to set the Q terminal of the one-shot 284 high. In turn, the $\overline{Q}$/ terminal of the latch 268 is set high. This high signal is applied to the $R_0$ terminals of both the counters 262 and 264 and is operative to reset the counts therein so that the synthesized voice message can be reproduced during successive data collection intervals for the duration of data collection.

Figure 6:
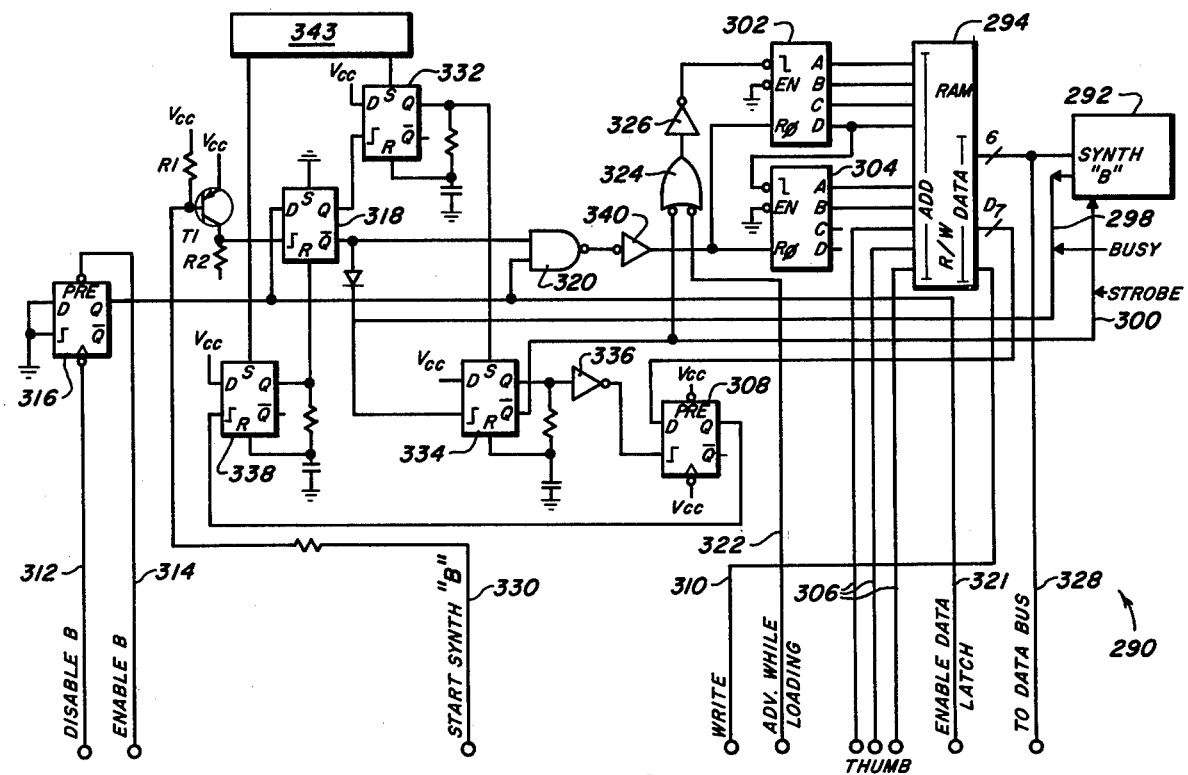
FIG. 6 shows a schematic diagram of the audio subsystem of the automatic audience survey system of the present invention.

Referring now to FIG. 6, generally designated at 290 is a schematic diagram of the audio subsystem peripheral of the automatic audience survey system of the present invention. As above noted, the audio subsystem of the automatic audience survey system provides an audio signal upon operator command which synthesizes in real-time a voice message having a portion which corresponds to one of the user selected queries above noted and a portion which corresponds to the current data representative of the concensus in regard to the question of interest. The audio subsystem peripheral 290 is preferably constructed on a PC board in a manner well known to those skilled in the art.

The audio-subsystem peripheral 290 includes a second voice synthesis module 292, preferably a General Instruments VSM 2032, having six data lines connected to a RAM 294, a line 298 marked "busy", and a line 300 marked "strobe". Lower and higher order address lines of the RAM 294 are respectively connected to a first counter 302 and a second cascaded counter 304. The highest order address lines of the RAM are connected to three lines 306 marked "thumb switch". A data line of the RAM 294 marked "$D_7$" is connected to the D terminal of a latch 308. A read/write line of the RAM 294 marked "R/W" is connected to a line 310 marked "write".

The system microprocessor is operative to apply a pulse to one of a line 312 marked "disable B" and a line 314 marked "enable B" which are respectively connected to the set terminal and the preset terminal of a latch 316 which respectively control the low and the high state of the Q terminal thereof. When the latch 316 is enabled, the Q terminal is set high and the high level is applied to the D terminal of a latch 318, to one input terminal of a NAND gate 320, and over a line 321 marked "data latch" to the system microprocessor.

The microprocessor is then operative to apply a pulse stream over a line 322 marked "advance while loading" to the enabled terminal of the counter 302 via a NOR gate 324 and an inverter 326. The counters 302 and 304 are responsive to the pulse stream applied over the line 322 and operative to controllably address sequential RAM address locations. Concurrently, the system microprocessor is operative to apply a pulse over the "write" line 310 at times which correspond to corresponding RAM address locations to enable the tabulated data respresentative of the consensus to be written into the RAM 294 via a line 328 marked "to data bus".

After the tabulated data corresponding to the consensus has been written into the preassigned address locations of the RAM 294, the system microprocessor is operative to apply a pulse over a line 330 marked "start synthesizer B" to the base of a transistor switch T 1. The transistor switch then applies a pulse which clocks the latch 318 and sets the Q terminal thereof high. The Q terminal of the latch 318 is connected to the rising edge triggered clock terminal of a one-shot 332. Whereby, the Q terminal of the one-shot 332 is set high. This high signal is applied to the set terminal of a one-shot 334. The $\overline{Q}$ terminal of the one-shot 334 is driven low thereby and the low signal both strobes the synthesizer 292 over the strobe line 300 to enable data transfer thereof and advances the counter 302 to address the RAM address locations having data corresponding to the appropriate syllable to be spoken.

The data that corresponds to the location addressed in the RAM is read to the synthesizer 292 and the corresponding syllable is synthesized. During this time, the busy line 298 is low. After the syllable has been synthesized, the busy line 298 goes high and triggers the one-shot 334 once again. The $\overline{Q}$ terminal goes low again and the low pulse is applied to the counter 302 which advances the count and addresses the next RAM address having data which corresponds to the next syllable to be synthesized. The low pulse is likewise applied to the strobe line 300 to enable the synthesizer 292 to read the data and synthesize the syllable that corresponds to the new address. This process is repeated until all of the syllables are addressed, read, and synthesized. At which time, the line $D_7$ of the RAM 294 goes high.

The high signal which appears on the line $D_7$ is applied to the D terminal of the latch 308. The output of an inverter 336 is applied to the rising edge trigger of the latch 308 and the input thereof is connected to the Q terminal of the one-shot 334. The rising edge of the signal provided out of the inverter 336 sets the Q terminal of the latch 308 high. The Q terminal of the one-shot 308 is connected to the clock terminal of a one-shot 338.

The high level at the clock input of the one-shot 338 set, the Q terminal thereof high. The Q terminal of the one-shot 338 is connected to the reset terminal of the latch 318. The high signal thereby applied to the reset terminal of the latch 318 sets the $\overline{Q}$ terminal thereof high. This high signal enables the NAND gate 320 which applies a logic low signal through an inverter 340 to the reset terminal of both of the counters 302 and 304 so that the process may be repeated.

Figure 7:
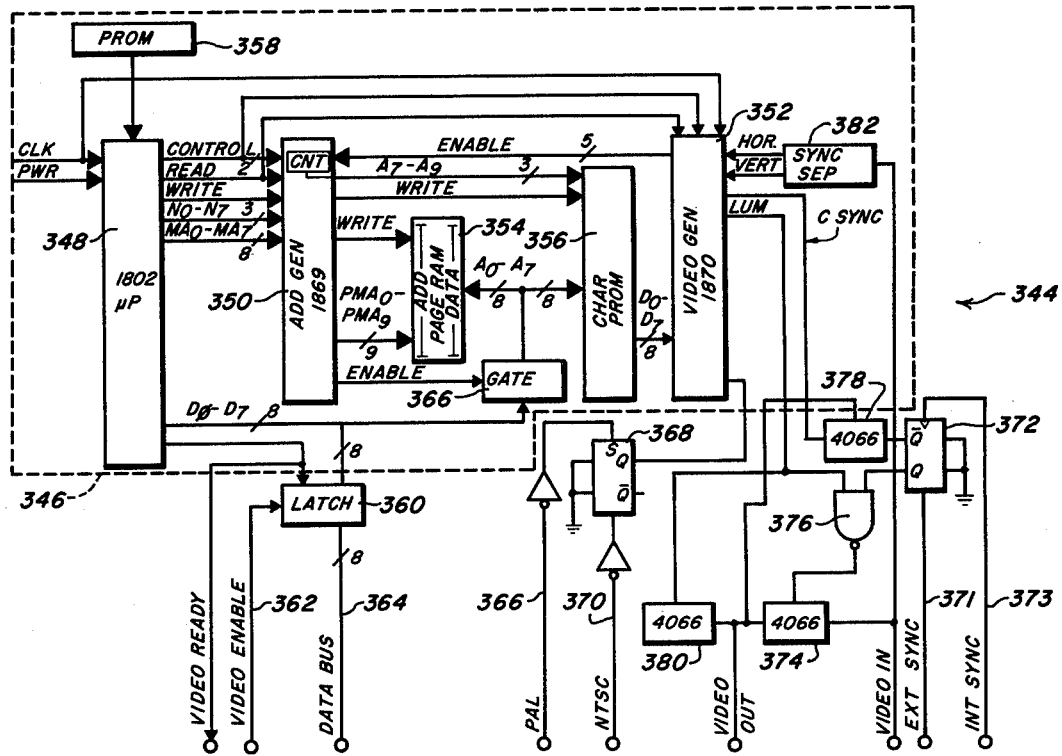
FIG. 7 shows a schematic block diagram of the video subsystem of the automatic audience survey system of the present invention.

Referring now to FIG. 7, generally designated at 344 is a schematic diagram of the video subsystem of the automatic audience survey system of the present invention. The video subsystem 344 is compatable at the selection of the operator with either the U.S. "NTSC" or the European "PAL" systems. The video subsystem 344 of the automatic audience survey system of the present invention is also operator selectable to use either an externally applied television synchronization signal or an internally generated television synchronization signal. The video subsystem is preferrably constructed on a PC board in a manner well known to those skilled in the art.

The video subsystem 344 preferably comprises a video interface control subsystem designated by the dashed box 346. The dashed box 346, includes a microprocessor 348, preferrably an RCA 1802, connected both to an address generator 350, preferrably an RCA 1869 chip, and to a video generator 352, preferrably an RCA 1870 chip. The address generator 350 is connected to a page RAM 354 and to a character PROM 356. The address generator 350 is operatively connected to the page RAM 354 via a write line and a ten line address bus marked "$PMA_0-PMA_9$". The data lines of the page RAM 354 are operatively connected via an eight line connection marked "$A_0-A_7$" to the address bus of the character PROM 356. The address lines, marked "$A_7-A_9$", of the character PROM are connected to an internal counter, marked "CNT", of the address generator 350. The video microprocessor 348 has a program PROM 358, a clock input, and a power input associated therewith in the usual manner. The video microprocessor 348 is operatively connected to the address generator 350 via two control lines, a read and a write line, three lines marked $N_0-N_3$, and an eight line memory address bus marked "$NA_0-NA_7$". An eight line video microprocessor data bus, marked "$D_0-D_7$", is connected to a data latch 360. The subsystem 346 is commercially available from the RCA Company as a CDP 1800-based CRT Controller and is operative in a manner well known to those skilled in the art.

In operation, the system microprocessor sends a pulse over a line 362 marked "data enable" which enables the latch 360 to transfer data from the system data bus representative both of the operator-selectable category and the consensus regarding the question of interest over eight lines 364 marked "data bus" to the data bus of the video microprocessor 348.

In response to an enable signal supplied by the address generator 350, a gate 366 is enabled and the data is written over the data bus of the video microprocessor 348 in successive preselected locations of the page RAM. The page RAM data then selectively addresses the character PROM 356 and corresponding character data is read over an eight line data bus, marked $D_0-D_7$", of the character PROM 356 to the video generator 352. The video generator 352 reads the character data and produces in response thereto a video signal having components marked "LUM" and "C SYNC" in the usual manner.

If the system is to be used in the European mode, the system microprocessor is operative to supply a pulse over a line 366 marked "PAL" which sets the Q terminal of the latch 368 to a high level. If the system is to be used in the U.S. television mode, the system microprocessor is operative to send a pulse over a line 370 marked "NTSC" to the reset terminal of the latch 368 which sets the Q terminal low. The Q terminal of the latch 368 is connected to the video generator 352 and the state of the signal applied thereto adapts in a well known manner the mode of video generation to either the U.S. or the European systems.

The video subsystem 344 can accept external television snychronization or generate its own internal synchronization signal at the command of the operator. The microprocessor is operative to apply a pulse to one of the clear and the preset terminals of a FF 372 over lines 371 and 373 marked "external sync" and "int sync" respectively which control the state of the Q terminals thereof. The $\overline{Q}$ terminal is connected to a bilateral switch 374 via a NAND gate 376. The $\overline{Q}$ terminal is connected to a bilateral switch 378 which receives the "C SYNC" line from the video generator 352. A third bilateral switch 380 is connected to the line marked "LUM". Whenever the Q terminal and "LUM" are high, internal synchronization is thereby selected as well as luminescence control. Whenever the $\overline{Q}$ terminal is high, external synchronization is selected.

Figure 8A:
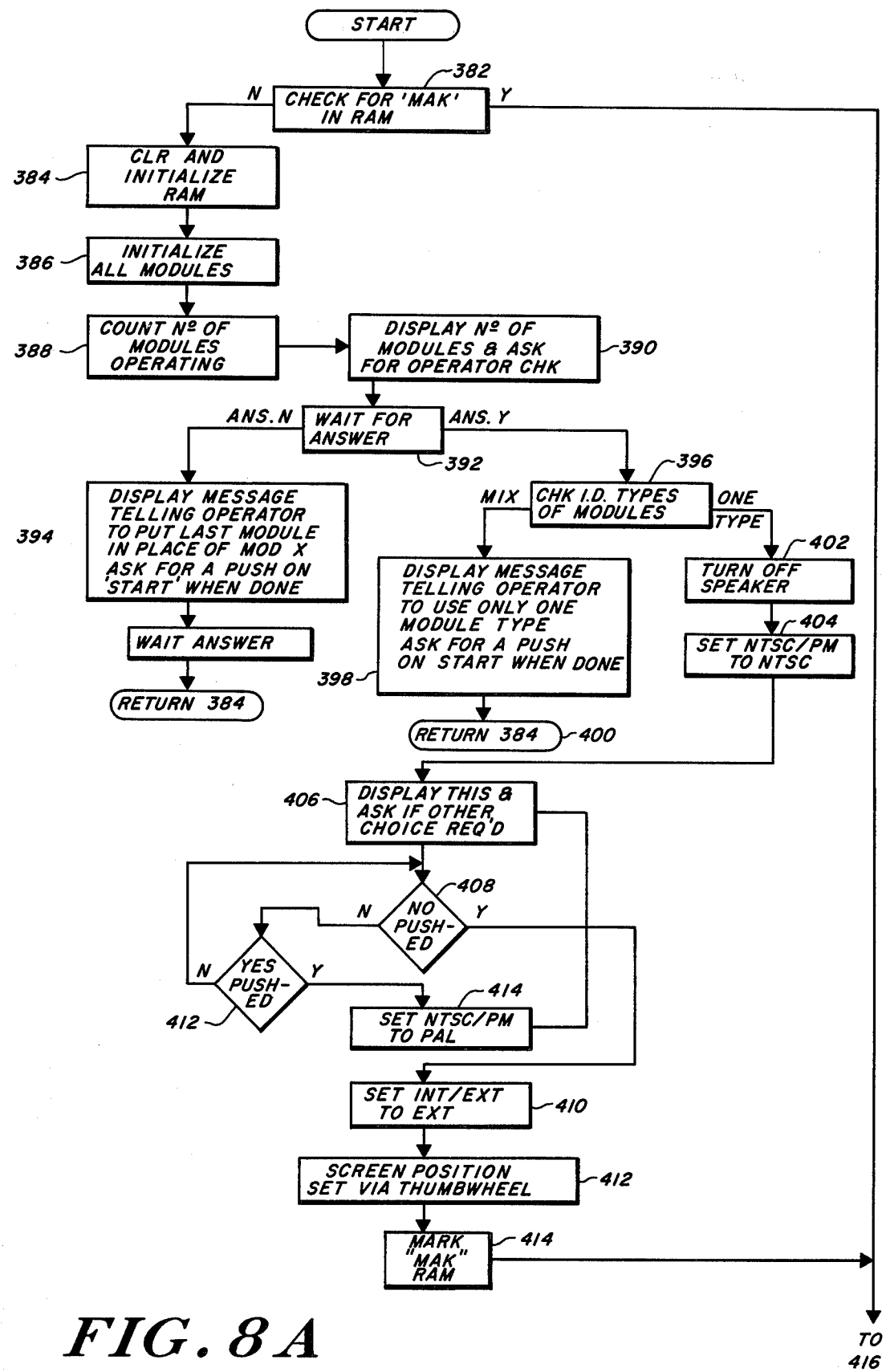
FIGS. 8A, 8B, and 8C a flowchart of the operation of the system microprocessor of the automatic audience survey system of the present invention.
Figure 8B:
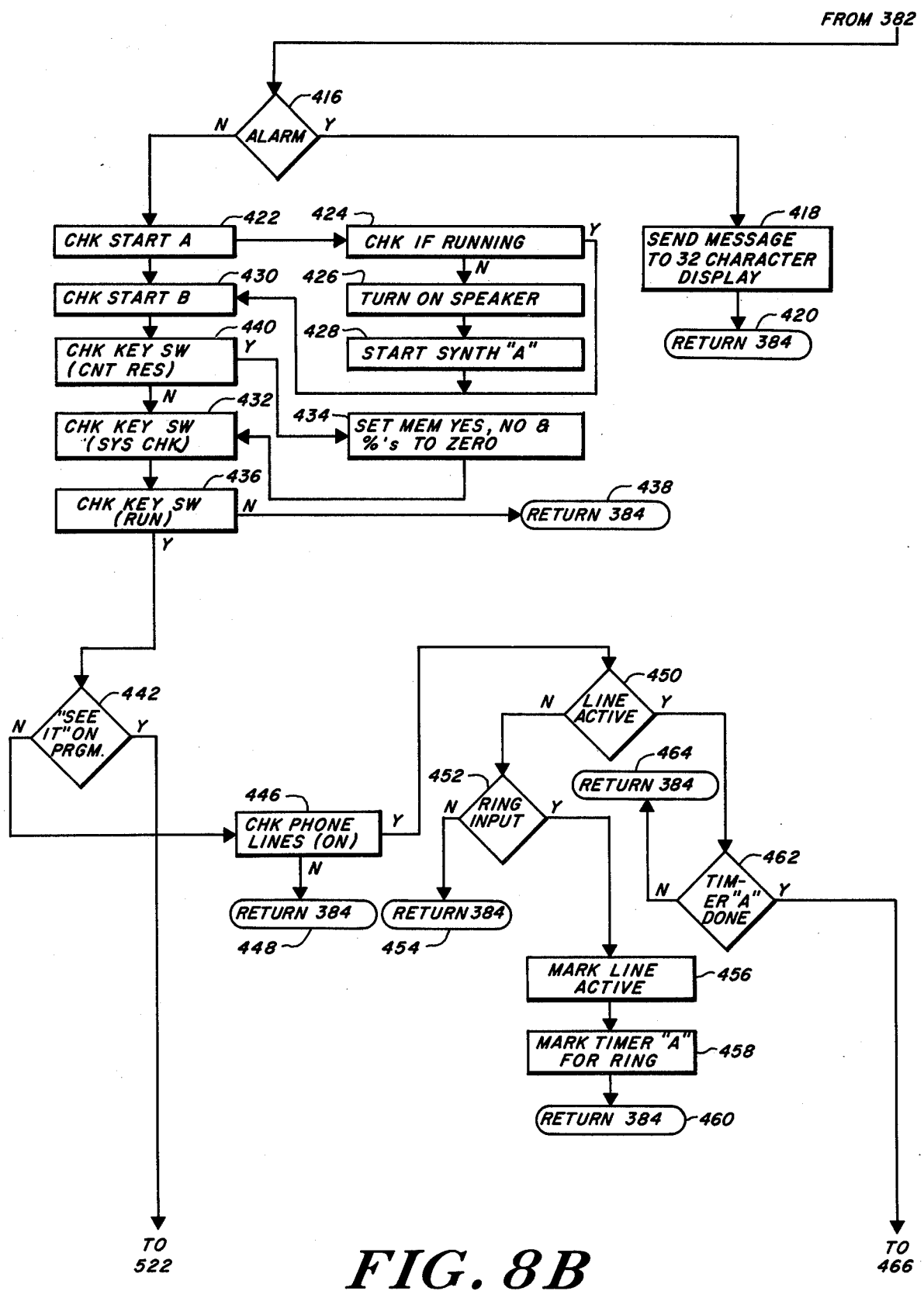
Figure 8C:
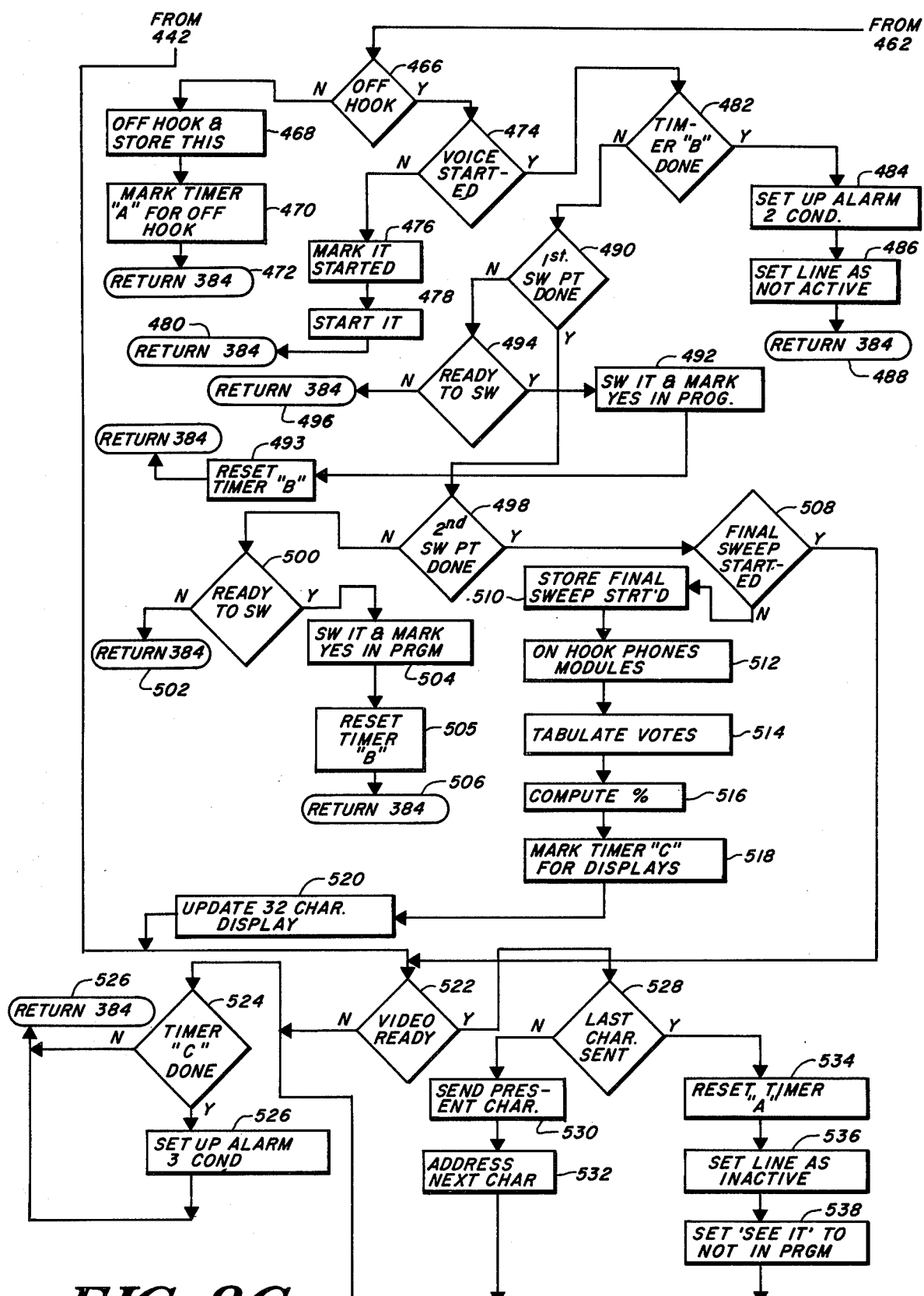

Referring now to FIG. 8, generally designated at 382 is a flow chart of the operation of the system microprocessor of the automatic audience survey system of the present invention.

As shown by a block 383, the system microprocessor is operative to check whether the word "MAK" appears in the system RAM. If not, the microprocessor is operative to clear and to initalize the RAM as shown by a block 384, to initilize the logic of all of the telephone interface subsystem modules as shown by a block 386, and to count the number of telephone lines interface control subsystems that are being used in a particular application as shown by a block 388.

As shown by a block 390, the microprocessor is then operative to display on the operator interactive display the count corresponding to the number of on-line telephone line interface controls and to ask the system operator whether the displayed count corresponds to the actual number of modules in use. The microprocessor than waits for a response as shown by a block 392.

Whenever the system operator determines that the actual number of telephone line interface modules does not correspond to the computer generated number of modules, the microprocessor is responsive to a push on the "No" button of the operator interface controls and is operative to display a message on the operator interactive display which requests that the operator replace the X+1 telephone line interface module with the X telephone line interface module and press the start control button whenever the act is completed as shown by a block 394. The processor is responsive to a push on the start button and is operative to return the processing to the block 386 whereupon the process is repeated until the numbers correspond.

As shown by a block 398, whenever the system operator determines that the number of actual interface modules does correspond to the computer generated number of modules, the microprocessor is then operative to test whether the telephone line modules each employ the same type of pollee response circuitry as shown by a block 396. Whenever individual ones of the telephone line interface modules employ a mix of word-recognition circuitry and voice-activation logic to recognize pollee response, the microprocessor is operative to display a message on the operator interactive display which requests that the operator replace the non-alike telephone line interface modules with modules of the same type or to pull out of the system the non-conforming modules. The microprocessor is also operative to request the operator to push the start button when the act is performed.

As shown by a block 398, the microprocessor is responsive to a push on the start button and is operative to return processing to the block 384 as shown by a block 400.

Whenever the microprocessor determines that only a single type of telephone line interface module is on line the microprocessor is operative to turn "off" an audio speaker which preferably housed within the housing of the automatic audience survey system as shown by a block 402. The system microprocessor is then operative to select NTSC as shown by a block 404 and to display a message on the operator interactive display which both inquires whether NTSC is suitable and requests the operator to push either the yes or the no switch of the operator interface controls as indicated by a block 406.

As shown by blocks 408 and 410, the microprocessor is responsive to a push on the no switch and then is operative to set synchronization to external. As shown by blocks 408, 412, and 414, if no is not pushed, the microprocessor is responsive to a push on the yes switch of the operator interface controls and is operative to set NTSC to PAL and processing is returned to the block 384 as shown by a block 406.

As shown by a block 416, the processor is then responsive to an operator selection of the position of the rotary switch of the operator interface controls and is operative to latch in memory the horizontal position of the CRT display where the data representative of the consensus and the particular operator selected catagory is to be displayed.

As shown by a block 414, the processor is then operative to mark "MAK" in RAM.

As shown by a block 416, the microprocessor is then operative to determine whether any system malfunctions to be described have produced an alarm signal indicative of the malfunction. Whenever an alarm condition has been detected, the processor is operative to generate a message to the operator on the operator interactive display advising the operator of the malfunction as shown by a block 418 and processing is returned to the block 384 as shown by a block 420.

Whenever an alarm condition has not been detected, the processor is responsive to a push on the start-A switch on the operator interface controls and is operative to switch the internal speaker in the On state and to start the A synthesizer as shown by blocks 422, 424, and 426.

As shown by the block 424 and by a block 430, the processor is responsive to a push on the start/B switch of the operator interface controls whenever either the start/A contact has not been pushed or the A synthesizer is already running and is operative to start the B synthesizer.

The processor is operative to control the B synthesizer in a manner similar to that described for the A synthesizer which is not illustrated for clarity of presentation.

As shown by a block 432, the processor is then responsive to whether the key switch of the operator interface controls is in the right hand count reset position and is operative to set yes, no, and % memories to zero as shown by a block 434.

As shown by a block 436, the processor is then responsive to whether the key switch of the operator interface controls is in the left hand system check position. When it is, the processor as shown by a block 438 is operative to return processing to the block 384.

As shown by a block 440 and a block 442, the processor is then responsive to the position of the key switch in the middle position and is operative to check whether a register "see it" is marked. If the switch is not in the run position, processing is returned to the block 384 as shown by a block 444. The "see it" register is marked in a manner to be described whenever the video subsystem of the automatic audience survey system of the present invention is in operation.

Whether the "see it" register is not marked, the processor is operative to detect whether any phone lines are "on" as shown by a block 446. If no phone lines are "on", processing returns to the block 384 as shown by a block 448. If there are phone lines "on", the processor is operative to determine whether any of the lines are active as shown by a block 450.

If no lines are active, the processor is operative to detect whether any of the lines have a ring signal as shown by a block 452. If no ring signals are present, processing is returned to the block 384 as shown by a block 454. If there is a ring on an incoming line, the processor is operative to mark the line active as shown by a block 456, to set a software timer designated "A" as shown by a block 458, and to return processing to the block 384 as shown by a block 460.

If there is a line active, the processor is operative to detect whether the timer "A" has elapsed as shown by a block 462. If the timer "A" has not elasped, processing returns to the block 384 as shown by a block 464.

If the timer "A" has elapsed the processor is operative to determine whether any of the active lines are in an off-hook condition as shown by a block 466. If no lines are in off-hook condition, the processor is operative to hold the active lines in an off-hook condition as shown by a block 468 and to initialize the software timer "A" for a countdown for a second predetermined time interval as shown by a block 470. Processing is then returned to the block 384 as shown by a block 372. It is to be noted that the total time interval counted by the software timer "A" corresponds to the data collection window 38 of FIG. 1B.

As shown by a block 474, whenever the active lines are in an off-hook condition, the processor is operative to determine whether the "A" synthesizer has begun to synthesize the analog voice signal which identifies the automatic audience survey system and queries audience response to the question of interest. As shown by a block 476, whenever the "A" synthesizer has not been started, the processor is operative to mark it started and to start it as shown by a block 478. An internal software timer "B" to be described is set and processing is then returned to the block 384 as shown by a block 480.

The processor is then operative to determine whether the second internal software timer B has elapsed as shown as a block 482. The time interval of the B timer is set to be greater than the processing time taken by the synthesizer A to synthesize the voice message. Thus, should the timer B elapse, the processor is operative to set up an alarm two condition as shown by a block 484.

The processor is then operative to mark the lines not active as shown by a block 486 and processing is returned to the block 384 as shown by a block 488.

As shown by a block 490, the processor is operative whenever the timer B has not elapsed to determine whether the first switch point corresponding to the last syllable of the first catagory of the operator selectable portion of the voice message has been reached, to mark it switched as shown by a block 492, and to rest the B timer as shown by a block 493. As shown by a block 494 and a block 496, processing is then returned to the block 384 until the first switch point has been reached.

As shown by a block 498, the processor is then operative to determine whether the second switch point corresponding to the last syllable of the second catagory of the operator selectable portion of the voice message has been reached. As shown by a block 500 and a block 502, processing returns to the block 384 whenever the second switch point has not been reached.

As shown by a block 504, when the second switch point is reached the processor is operative to mark the second switch point yes, to reset the B timer as shown by a block 505, and processing is then returned to the block 384 as shown by a block 506.

As shown by a block 508, the processor is then operative to determine whether the final sweep corresponding to the data tabulation window 50 of FIG. 1B has been commenced. If not, as shown by a block 510, the processor is operative to mark final sweep started.

As shown by a block 512, the processor is then operative to place the phone lines in an on-hook condition.

As shown by a block 514, the processor is then operative to tabulate the votes and to compile data in percentage terms representative of the consensus of opinion in regard to the question of interest as shown by a block 516.

As shown by a block 518, the processor is then operative to mark a third software timer designated timer "C" for use in gauging the time performance of the video display.

The processor is then operative to update the 32 character plasma interactive display as shown by a block 520.

As shown by a block 522, the processor is then operative to determine whether the video subsystem of the automatic audience survey system of the present invention is ready to accept data. If the video subsystem is not ready and the C timer has not elapsed as shown by a block 524, processing is returned to the block 384 as shown by a block 526. If the video is not ready and the C timer has elapsed, an alarm condition three is established and processing is returned to the block 384 as indicated by a block 526.

As shown by a block 528, if the last video character has not been sent, the processor is operative to send the present video character as shown by a block 530, to address the next character to be sent as shown by a block 532 and processing is returned to the block 384 provided the timer C has not yet elapsed.

As shown by a block 534, after the last character has been sent, the processor is operative to reset the A timer, to set the lines inactive as shown by a block 536, and to set "see it" to not in progress as shown by block 538.

It is to understood that many modifications of the presently disclosed invention are possible without departing from the scope of the appended claims.

What is claimed is:

1. A telephone based single phone number accessed automatic audience survey system for obtaining information representative of the opinion of an audience regarding a question of interest from a plurality of individuals of said audience, comprising in combination:

a first means for holding a plurality of phone lines in an off-hook condition in response to individuals of said audience calling said single phone number;

a second means operatively connected to said plurality of phone lines in said off-hook condition for providing a voice-message to each of said plurality of phone lines simultaneously which asks each such individual for a response in one of at least two selectable categories in regard to said question of interest;

a third means operatively connected to said phone lines in said off-hook condition for storing data in preselected data latches that respectively correspond to said selectable categories in accordance with the particular responses of the individuals; and a fourth means connected to said preselected data latches for tabulating said data representative of the particular responses of the individuals of said audience to provide composite data representative of the opinion of said audience.

2. The telephone based single number accessed automatic audience survey system of claim 1, wherein said first means includes a telephone line interface control subsystem operative to detect a ring and to hold individual lines in an off-hook condition in response to detecting said ring.

3. The telephone based single phone number accessed automatic audience survey system as recited in claim 2, wherein each of said telephone line interface control subsystems include a CH 1810 direct telephone line interconnect chip.

4. The telephone based single phone number accessed automatic audience survey system of claims 2 or 3, wherein said fourth means includes a microprocessor operatively connected to said telephone line interface control subsystems and having a non-volatile RAM associated therewith.

5. The telephone base single phone number accessed automatic audience survey system of claim 1, wherein said second means includes a first voice synthesis subsystem operatively connected to said first means.

6. The telephone based single phone number accessed automatic audience survey system of claim 5, wherein said voice synthesis subsystem includes a VSM 2032.

7. The telephone base single phone number accessed automatic audience survey system of claims 5 or 6, wherein said forth means includes a microprocessor operatively connected to said voice synthesis subsystem.

8. The telephone based single phone number accessed automatic audience survey system of claim 1 wherein said third means includes a time-responsive voice activated switch operatively connected to said data latches.

9. The telephone based single phone number accessed automatic audience survey system of claim 1, further including a fifth means operatively connected to said fourth means for providing in real-time a video signal representative of said opinion.

10. The telephone based single phone number accessed automatic audience survey system of claims 1 or 9, further including a sixth means operatively connected to said fourth means for providing in real-time an analog voice signal representative of said opinion.

11. An automatic telephone polling system connected to a single phone number accessible rotary-type telephone exchange which provides audience opinion information in regard to a matter of interest, comprising:

a system microprocessor;

a voice synthesis subsystem connected to said system microprocessor for providing an analog voice signal having a common portion with synthesises a message including an operator selectable query portion which queries audience opinion on the matter of interest in at least two audience selectable response categories;

a plurality of telephone line interface control subsystems each responsive to calls received from said rotary-type exchange and connected to said system microprocessor and operative to detect incoming calls from said rotary-type telephone exchange, to hold said detected calls in an off-hook condition, to apply said analog synthesized voice signal from said voice synthesis subsystem to said detected calls in the off-hook condition simultaneously, and to provide data respectively representative of corresponding ones of said selectable categories in response to the corresponding oral responses to said query portions of said voice synthesized message provided by individuals of said audience; and means connected to said system microprocessor and responsive to said data for displaying in real-time composite data representative of the audience opinion.

12. The automatic telephone polling system of claim 11, wherein said means is an operator interactive plasma display.

13. The automatic telephone polling system of claim 12, wherein said plasma display is an APD 32 A025.

14. The automatic telephone polling system of claim 11, wherein said means is a video character generator subsystem for displaying said composite data representative of said opinion in real-time.

15. The automatic telephone polling system of claim 11, wherein said means is an audio voice synthesis subsystem for providing an analog signal representative of said composite data in real-time.

16. The automatic telephone polling system of claim 15, wherein said audio voice synthesis subsystem includes a counter controlled PROM operatively connected to a VSM 2032 voice synthesis module.

17. The automatic telephone polling system of claims 12, 14, or 15, wherein each of said telephone line interface control subsystems includes a time-responsive and voice activated switch and a data latch.

18. The automatic telephone polling station of claim 17, wherein said telephone line interface control subsystems each include a CH 1810.

19. A telephone based automatic audience survey system for polling an audience to obtain data over a predetermined plurality of data collection intervals representative of the opinion regarding a question of interest, each of said data collection intervals including a data collection window, a vote enable window, and a vote tabulate window, comprising:

a processor;

first means connected to said processor and responsive to incoming calls during successive ones of said data collection windows of said data collection intervals for holding said calls in an off-hook condition;

second means connected to said first means and said processor and responsive to said calls in an off-hook condition during successive ones of said vote enable windows of said data collection intervals for answering said calls with an analog voice signal that includes an automatic audience survey system query portion that asks for an oral response in one of at least two audience-selectable answer categories in regard to the question of interest;

third means connected to said first means, said second means, and said processor and responsive to the oral responses provided to said query portions of said analog voice signal during successive ones of said vote enable windows of said data collection intervals for providing data in data latches respectively representative of the corresponding one of said audience-selectable answer categories regarding the question of interest; and fourth means connected to said third means and said processor and responsive to said data during successive ones of said vote tabulate windows of said data collection intervals for providing in real-time composite information respresentative of the opinion.

20. The automatic audience survey system of claim 19 further including fifth means operatively connected to said fourth means for displaying said composite data in real-time.

21. The automatic audience survey system of claim 20, wherein said third means is operative to provide a video signal representative of said data in real-time.

22. The automatic audience survey system of claim 20, wherein said fifth means is operative to provide an audio signal representative of said data in real-time.

23. The automatic audience survey system of claim 20, wherein said fifth means includes a plasma operator interactive display.

24. The automatic audience survey system of claims 19, 20, 21, 22 or 23, wherein said processor has a non-volatile RAM associated therewith, said first means includes a plurality of telephone line interface control subsystems, and said second means includes a voice synthesis subsystem operative to provide a synthesized analog voice message simultaneously to said calls in an off-hook condition.

25. The automatic audience survey system of claim 24, wherein each of said telephone line interface control subsystem includes a CH 1810 chip.

26. The automatic audience survey system of claim 24, wherein said voice synthesis subsystem includes a VSM 2032 chip.

27. The automatic audience survey system of claims 19, 20, 21, 22, or 23, wherein said third means includes a time-responsive voice activated data latch associated with respective telephone line interface control subsystems, and further includes means connected to respective data latches to provide a sequential readout therefrom to said processor for compiling said data representative of the consensus in regard to the question of interest.

28. A telephone-based automatic audience survey system, comprising:

first means for holding in an off-hook condition a plurality of telephone lines that ring in response to calling a single preassigned telephone number;

second means connected to said first means for simultaneously providing a voice message over each of said off-hook lines which asks for a response to a preselected question;

third means connected to said first means and said second means and responsive to the oral responses to said preselected question for providing data representative of said oral responses in respective preselected categories; and fourth means connected to said first means, said second means, and said third means for providing data representative of the responses in real-time.

29. The telephone based automatic audience survey system of claim 28, wherein said first means includes a CH 1810.

30. The telephone based automatic audience survey system of claim 29, wherein said second means includes a VSM 2032.

31. The telephone based automatic audience survey system of claim 30, wherein said third means includes a voice actuated data latch.

32. The telephone based automatic audience survey system of claim 31, wherein said fourth means includes a system microprocessor.

33. The telephone based automatic survey system of claim 32, further including a non-volatile RAM connected to said microprocessor.

34. The telephone base automatic audience survey system of any one of claims 29 through 32, further including means for displaying said data in real-time over a video feed line.

* * * * *